(12) United States Patent
Lipson et al.

(10) Patent No.: US 8,457,453 B2
(45) Date of Patent: Jun. 4, 2013

(54) PASSIVELY-THERMALLY-STABILIZED PHOTONIC APPARATUS, METHOD, AND APPLICATIONS

(75) Inventors: Michal Lipson, Ithaca, NY (US); Biswajeet Guha, Ithaca, NY (US)

(73) Assignee: Cornell University, Ithaca, NY (US)

( * ) Notice: Subject to any disclaimer, the term of this patent is extended or adjusted under 35 U.S.C. 154(b) by 401 days.

(21) Appl. No.: 12/916,663

(22) Filed: Nov. 1, 2010

(65) Prior Publication Data

US 2011/0102804 A1    May 5, 2011

Related U.S. Application Data

(60) Provisional application No. 61/257,144, filed on Nov. 2, 2009, provisional application No. 61/258,383, filed on Nov. 5, 2009, provisional application No. 61/263,575, filed on Nov. 23, 2009.

(51) Int. Cl.
*G02B 6/12* (2006.01)
*G01B 9/02* (2006.01)

(52) U.S. Cl.
USPC ........ 385/14; 385/2; 385/31; 385/42; 385/43; 385/129; 385/132; 385/122

(58) Field of Classification Search
USPC ............... 385/1, 2, 14, 15, 31, 39, 40, 42, 43, 385/88, 89, 92, 129, 130, 131, 132; 356/450, 356/460, 461, 477, 480
See application file for complete search history.

(56) References Cited

U.S. PATENT DOCUMENTS

| | | | |
|---|---|---|---|
| 5,289,256 A * | 2/1994 | Gramling | 356/477 |
| 6,256,442 B1 * | 7/2001 | Nolan et al. | 385/129 |
| 7,092,591 B2 | 8/2006 | Savchenkov et al. | |
| 7,245,801 B2 | 7/2007 | Boyd et al. | |
| 7,362,927 B1 | 4/2008 | Ilchenko et al. | |
| 7,389,053 B1 | 6/2008 | Ilchenko et al. | |
| 7,454,101 B2 | 11/2008 | Jones | |
| 7,519,249 B2 | 4/2009 | Gill et al. | |
| 7,532,789 B1 | 5/2009 | Doylend | |
| 7,548,668 B2 | 6/2009 | Chen | |
| 7,583,879 B2 | 9/2009 | Chu et al. | |
| 7,630,417 B1 | 12/2009 | Maleki et al. | |
| 7,639,910 B2 | 12/2009 | Yamazaki | |
| 7,667,200 B1 | 2/2010 | Watts et al. | |

(Continued)

OTHER PUBLICATIONS

Uenuma et al.; Temperature-independent silicon waveguide optical filter; Mar. 1, 2009, vol. 34, No. 5, Optics Letters; Optical Society of America, 2009.

*Primary Examiner* — Brian Healy
(74) *Attorney, Agent, or Firm* — William Greener; Bond, Schoeneck & King, PLLC

(57) ABSTRACT

Apparatus and methods that compensate for the thermally-induced drift of the resonance frequency of a closed-loop resonator include, in an exemplary embodiment, a waveguide-based Mach-Zehnder interferometer (MZI) and an overcoupled, waveguide-based microring resonator. The temperature-induced red-shifting ring resonance can be balanced by a spectral blueshift with temperature of the MZI. To stabilize the resonance of the ring at a given wavelength, the change in optical path lengths with temperature of the ring and the MZI should be equal and opposite. The interplay of nonlinear change in phase of ring resonator with temperature and linear change in phase of MZI with temperature, along with matching the period of this phase change, gives rise to perfect oscillation in the combined system resonance with temperature.

19 Claims, 19 Drawing Sheets

U.S. PATENT DOCUMENTS

| | | |
|---|---|---|
| 7,751,654 B2 | 7/2010 | Lipson et al. |
| 7,899,279 B2 * | 3/2011 | Nasu et al. ............ 385/14 |
| 2002/0154846 A1 * | 10/2002 | Nolan et al. ............ 385/14 |
| 2006/0188193 A1 * | 8/2006 | Lenzi ............ 385/14 |
| 2006/0193557 A1 | 8/2006 | Bradley et al. |
| 2009/0273842 A1 | 11/2009 | Socci et al. |
| 2010/0158429 A1 | 6/2010 | Popovic |
| 2011/0102804 A1 * | 5/2011 | Lipson et al. ............ 356/480 |

* cited by examiner (a)  (b)

(a)          (b)

PASSIVELY-THERMALLY-STABILIZED PHOTONIC APPARATUS, METHOD, AND APPLICATIONS

CROSS-REFERENCE TO RELATED APPLICATIONS

This application claims priority to U.S. provisional Patent Application Ser. Nos. 61/263,575 filed on Nov. 23, 2009, 61/257,144 filed on Nov. 2, 2009, and 61/258,383 filed on Nov. 5, 2009, the subject matter of all of which are incorporated herein by reference in their entireties.

FEDERALLY SPONSORED RESEARCH

This invention was made with government support under Project ID No. 0446571 awarded by the National Science Foundation. The government has rights in this invention.

BACKGROUND OF THE INVENTION

1. Field of the Invention

Embodiments of the invention relate generally to photonic components, more particularly to passively-thermally-stabilized, ultra low power photonic interconnect apparatus and methods and, even more particularly to CMOS (Complementary Metal-Oxide-Semiconductor)-compatible apparatus, methods, and applications thereof.

2. Technical Background

Si nanophotonics enables CMOS-compatible systems consisting of optics and electronics in a single, highly integrated system. One of the exciting opportunities for Si nanophotonics is ultra low power interconnects leading to efficient and low power computing. In theory, optical interconnects can enable large bandwidths with low power owing to the large carrier frequency (200 THz) and to the fact that one can propagate light at frequencies at which silicon is transparent (no intrinsic losses). However ultralow power photonic interconnects compatible with current CMOS microelectronics have not yet been demonstrated, mainly because the power needed to stabilize these photonic components with temperature is prohibitively high, due to the high thermo-optic coefficient of silicon.

Most solutions proposed to overcome this problem are either power hungry or require materials that are not compatible with standard CMOS processing. Work has been reported on cladding silicon photonic structures with polymeric based materials with negative thermo-optic coefficient for thermal compensation. Since such materials have a negative thermo-optic coefficient in contrast to silicon, which has a positive thermo-optic coefficient, passive compensation was possible. Such structures, however, are currently not compatible with front-end CMOS processing due to the polymer, which is incompatible with such processing. Moreover, reliability is a major concern for commercial devices incorporating polymeric materials. Another reported approach uses local heating to dynamically stabilize the devices. This is done is several different ways—using external metal heaters, direct heating of the silicon device by alternating the bias current for an active device or, using silicon itself as a resistive material for heating. All of these approaches are active and require substantial space and power consumption, which often accounts for the largest share in power budget of state-of-the-art silicon photonics. M. Uenuma and T. Moooka, *Temperature-independent silicon waveguide optical filter*, Opt. Lett. 34, No. 5, 599-601 (2009) describe a Mach-Zehnder interferometer optical filter on a silicon-on-insulator substrate that theoretically could reduce its temperature-dependent wavelength shift to less than 1 pm/° C. by a selected combination of narrower and wider silicon waveguide arms of the Mach-Zehnder interferometer and, completely eliminate the temperature dependence if the appropriate combination of $\Delta L$ and $L'$ could be experimentally realized.

In view of the aforementioned shortcomings and disadvantages with the state of the art, the inventors have recognized the need for CMOS-compatible passive compensation of the thermo-optic effect in silicon photonic devices. There is particularly a need for being able to thermally stabilize resonant devices because resonant devices such as microring resonators are ideally suited for dense integration of optical networks due to their compact size, high extinction ratio per unit length, low insertion loss and low power consumption. Moreover, the recognized advantages and benefits obtainable by addressing this need and as provided by the embodied invention include, but are not limited to, complete control over the temperature sensitivity of silicon-integrated and, in particular, Mach-Zehnder, interferometers; athermal operation of closed-loop and, in particular, silicon-integrated, microring resonators; broadband operation over a wide temperature range, with less than 3 dB degradation in the overall extinction ratio; fully CMOS-compatible processing and manufacturing with complete passive thermal stabilization; and, self-stabilized photonic structures requiring no additional tuning power, which typically accounts for the largest share in the power budget of Si photonics.

SUMMARY

Most generally, embodiments of the invention are directed to apparatus and methods that compensate for the thermally-induced drift of the resonance frequency of a closed-loop resonator. Simply, in an exemplary embodiment of a photonic component that includes a waveguide-based Mach-Zehnder interferometer (MZI) and an overcoupled, waveguide-based microring resonator, the red-shifting temperature-induced ring resonance can be balanced by a spectral blueshift with temperature of the MZI. To stabilize the resonance of the ring at a given wavelength, a given amount of compensating phase is added by the MZI at that wavelength at every given temperature as the ring phase spectra redshifts. Since the periodic ring phase spectrum is nonlinear, when the actual, periodic, linear phase added by the MZI is matched with that of the ring, this periodic mismatch between the phase added by the MZI and the phase compensation required gives rise to perfect oscillation in the ring resonance with temperature. We refer to this property, herein, as "self-restoring thermal phase shift."

An embodiment of the invention is a photonic apparatus, comprising an interferometer having a second arm, wherein the interferometer is characterized by a negative net optical path length change as a function of temperature, $\delta L_M/\delta T$; and a waveguide closed loop resonator characterized by a positive optical path length change as a function of temperature, $\delta L_R/\delta T$, disposed in light-coupling proximity to the second interferometer arm, wherein the absolute value of $\delta L_M/\delta T$ is equal to the absolute value of $\delta L_R/\delta T$, such that the apparatus is characterized by a resonance having substantially no spectral shift as a function of temperature, wherein the apparatus is an athermal/temperature insensitive, resonant photonic device. According to an aspect, the interferometer further comprises a first waveguide arm having a length $L_1$ wherein at least a portion of the first waveguide arm, $L_{1W(1)}$, has a width $w_1$, and an effective mode index $n_{eff(1)}$; and, wherein the second arm is a waveguide having a length $L_2$ and a width $w_1$, wherein at least a portion of the second waveguide arm, $L_{2W(2)}$, has a maximum width $w_2$ that is less than $w_1$ over $L_{2W(2)}$, and the second waveguide arm is optically coupled to the first waveguide arm, further wherein the interferometer is characterized by an effective mode index $n_{eff(2)}$, where $|L_2-L_1|=\Delta L\neq 0$, $L_{2W(2)}=L_{1W(1)}$, $w_1-w_2=\Delta w$, and $|n_{eff(2)}-n_{eff(1)}|=\Delta n_{eff}\neq 0$. The second waveguide arm may be tapered over transition regions between $L_2$ and $L_{2W(2)}$. In a non-limiting aspect, the interferometer is a waveguide-based Mach-Zehnder interferometer (MZI). In a non-limiting aspect, the closed loop waveguide resonator is a ring resonator having a radius, R. In a non-limiting aspect, the interferometer and the closed loop resonator are integrated on a chip. In a non-limiting aspect, the first and second waveguide arms are each in the form of a coil. In a non-limiting aspect, the photonic apparatus is further characterized by a controllable positive or negative temperature sensitivity. In a non-limiting aspect, the interferometer is further characterized by an interference order, M, where M can be any positive or negative integer or zero at $\Delta\lambda/\Delta T=0$, where $\Delta\lambda/\Delta T$ represents the temperature sensitivity of any wavelength value within a given wavelength spectrum. In an illustrative aspect, the photonic apparatus is characterized by an optical resonance that oscillates about a central wavelength with change of temperature. The apparatus is characterized by a temperature-dependent transmission function, $$\rho(T)=\frac{1}{2}\{1+[(t-\alpha\exp(i\beta L_R(T)))/(1-\alpha t\exp(i\beta L_R(T)))]\exp(i\beta L_{MZI}(T))\},$$

where t is the through-coupling of the ring to the second waveguide arm, $(1-\alpha)$ is the round-trip loss in the ring, $L_R$ is the net optical path length of the ring, and $L_{MZI}$ is the net optical path length of the MZI. In a non-limiting aspect, the photonic apparatus includes only a single MZI and a plurality, n, of waveguide ring resonators serially disposed in light-coupling proximity to the second arm, wherein each ring resonator has a different radius, $R_n$. Each resonator has a resonance such that the resonances are spectrally equidistant and non-overlapping, where $\lambda_n-\lambda_{n-1}$=(free spectral range of any resonator)/n. The apparatus may be a temperature insensitive electro-optic modulator.

According to an embodiment, a method for stabilizing the temperature-induced drift of the optical resonance of a closed loop resonator at a given wavelength includes the steps of providing a closed loop resonator characterized by a phase spectrum in the form of a resonance that non-linearly redshifts in wavelength with increase in temperature and phase at any given wavelength; and providing a matching phase spectrum that changes linearly with temperature at the given wavelength, wherein the matched phase spectrums have a phase change from $\Phi_0$ to $\Phi_0+2\pi$ over the temperature change ($\Delta T$). According to an aspect, the closed loop resonator has a positive optical path length change as a function of temperature, $\delta L_R/\delta T$, and the step of providing a matching phase spectrum further includes coupling light from the closed loop resonator to an arm of an interferometer that is characterized by a negative net optical path length change as a function of temperature, $\delta L_M/\delta T$, where the absolute value of $\delta L_M/\delta T$ is equal to the absolute value of $\delta L_R/\delta T$.

Additional features and advantages of the invention will be set forth in the following detailed description and will be readily apparent to those skilled in the art from that description and/or recognized by practicing the invention as described in following detailed description, the drawings, and the appended claims.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF EMBODIMENTS OF THE INVENTION

Figure 1:
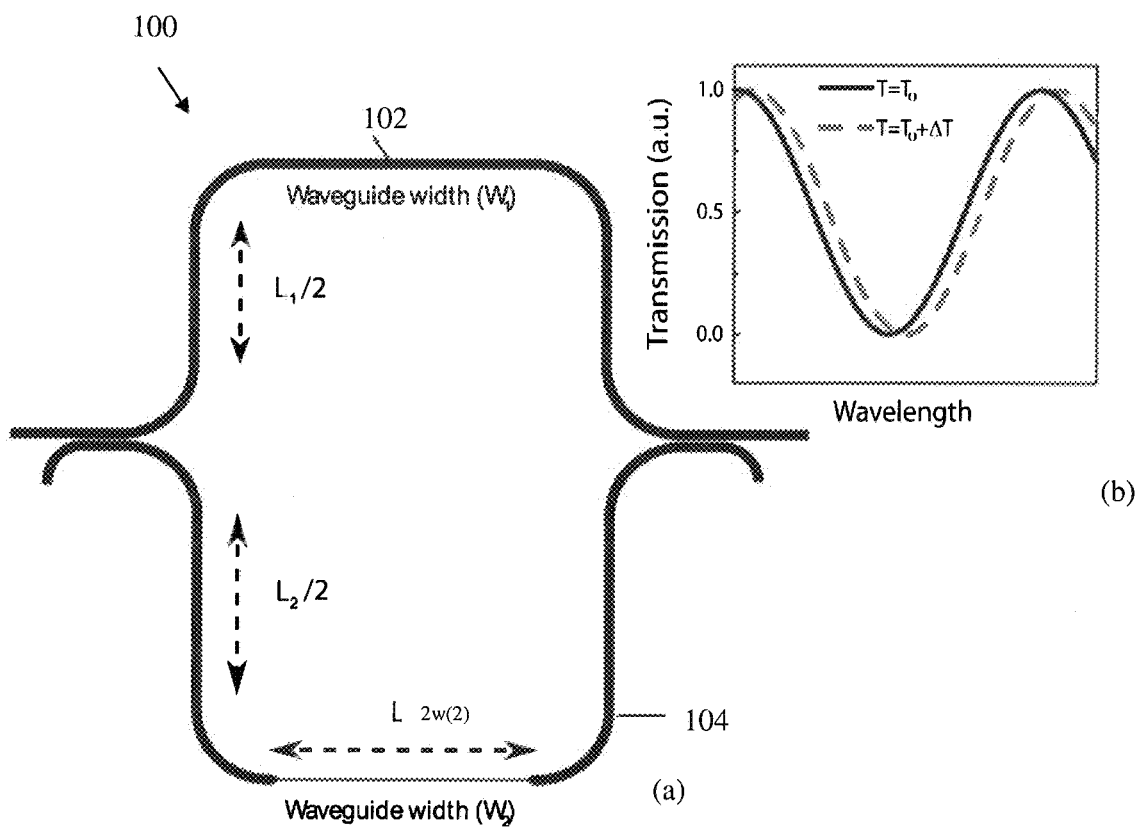
FIG. 1(a) schematically shows a waveguide-based MZI with various lengths and waveguide widths, according to an exemplary aspect of the invention.
FIG. 1(b) shows the effect of temperature on transmission of a typical uncompensated MZI.

Reference will now be made in detail to non-limiting, exemplary embodiments of the invention along with examples as illustrated in the accompanying drawings. Wherever possible, the same reference numbers will be used throughout the drawings to refer to the same or like parts.
Mach-Zehnder Interferometer (MZI) with Negative Temperature Sensitivity A Mach-Zehnder interferometer 100 having negative temperature sensitivity is schematically illustrated in FIG. 1. The exemplary MZI 100 is a waveguide-based MZI fabricated on a silicon-on-insulator wafer, as described in more detail below. The MZI includes a first waveguide arm 102 having a length $L_1$ and a width $w_1$ typically over its entire length but at least over a portion denoted $L_{1W(1)}$, and an effective mode index $n_{\textit{eff}(1)}$; and, a second waveguide arm 104 having a length $L_2$ and a width $w_1$ over a portion of $L_2$, and a maximum width $w_2$ that is less than $w_1$ over a portion $L_{2W(2)}$. The second waveguide arm is optically coupled to the first waveguide arm via 3 dB directional couplers at an input and at an output as in a conventional waveguide-based MZI.

The MZI 100 works on the principle that the guided mode encounters different effective mode index changes with temperature ($\delta n_{\textit{eff}}/\delta T$) in the two arms of the MZI, induced by the different waveguide widths. By choosing the proper arm lengths, the temperature sensitivity of one arm can be set to cancel that of the other, and overall temperature sensitivity can be brought down to zero or made negative. As embodied herein, the thermo-optic effect between the two interfering arms is balanced or adjusted while still maintaining a certain phase difference between the two arms as required by the filter specification. While one of the arms propagates a length of L horizontally and $L_1$ vertically (as shown in FIG. 1) with constant waveguide width of $w_1$, the other arm propagates a length $L_2$ with waveguide width of $w_1$ that tapers down to a width of $w_2$ that is less than $w_1$ over a length $L_{2W(2)}$.

The overall temperature dependence of the MZI can be derived from the temperature dependence of the net optical path length, given by the difference in propagating lengths in the two arms ($\Delta L$) with a given effective mode index ($n_{\textit{eff}}$) and the difference in mode indices ($\Delta n_{\textit{eff}}$) over a fixed length (L). It can be expressed as $$m\lambda_0 = n_{\textit{eff}} \Delta L + \Delta n_{\textit{eff}} L \quad (1)$$

where $|L_2-L_1|=\Delta L \neq 0$, $L_{2W(2)}=L_{1W(1)}=L$, $w_1-w_2=\Delta w$, $|n_{\textit{eff}(2)}-n_{\textit{eff}(1)}|=\Delta n_{\textit{eff}} \neq 0$, and m is the interference order at a given wavelength $\lambda_0$. m can be chosen to be an integer to give constructive interference at that wavelength, or a half-integer to give destructive interference. According to the illustrative aspect, m was chosen to be a half integer to focus on the shift with temperature of a minima point of the spectrum. In practice, m and $\lambda_0$ will be determined by the filter function requirements. Due to waveguide dispersion (the change in effective mode index versus wavelength), the interference order is modified as $$M = m - \Delta L \delta n_{\textit{eff}}/\delta \lambda - L \delta(\Delta n_{\textit{eff}})/\delta \lambda \quad (2)$$

The temperature sensitivity of any minima point of the spectrum ($\lambda_0$) can then be expressed as $$\Delta \delta_0/\Delta T = [(\Delta L \delta n_{\textit{eff}}/\delta T) + (L \delta(\Delta n_{\textit{eff}})/\delta T)]/M \quad (3)$$

From Eq. (3) it can be shown that if $\Delta L$ and $\Delta n_{\textit{eff}}$ are chosen appropriately with proper signs, the minima shift can be brought down to zero.

In the instant illustrative aspect, the waveguides have a fixed height of 250 nm. We calculated the effective indices ($n_{\textit{eff}}$), $\delta n_{\textit{eff}}/\delta T$, and $\delta n_{\textit{eff}}/\delta \lambda$ for TE modes of different waveguide widths using a full-vector finite element mode solver. We took the TO coefficient of Si as $1.86 \times 10^{-4}$ $K^{-1}$ and that of the oxide cladding as $1 \times 10^{-5}$ $K^{-1}$. $w_1$ was fixed as 450 nm while $w_2$ was varied, and the corresponding thermal spectral shifts were studied. The results presented below are for a MZI designed for an interference order (m) of 50.5 at 1550 nm.

Figure 2:
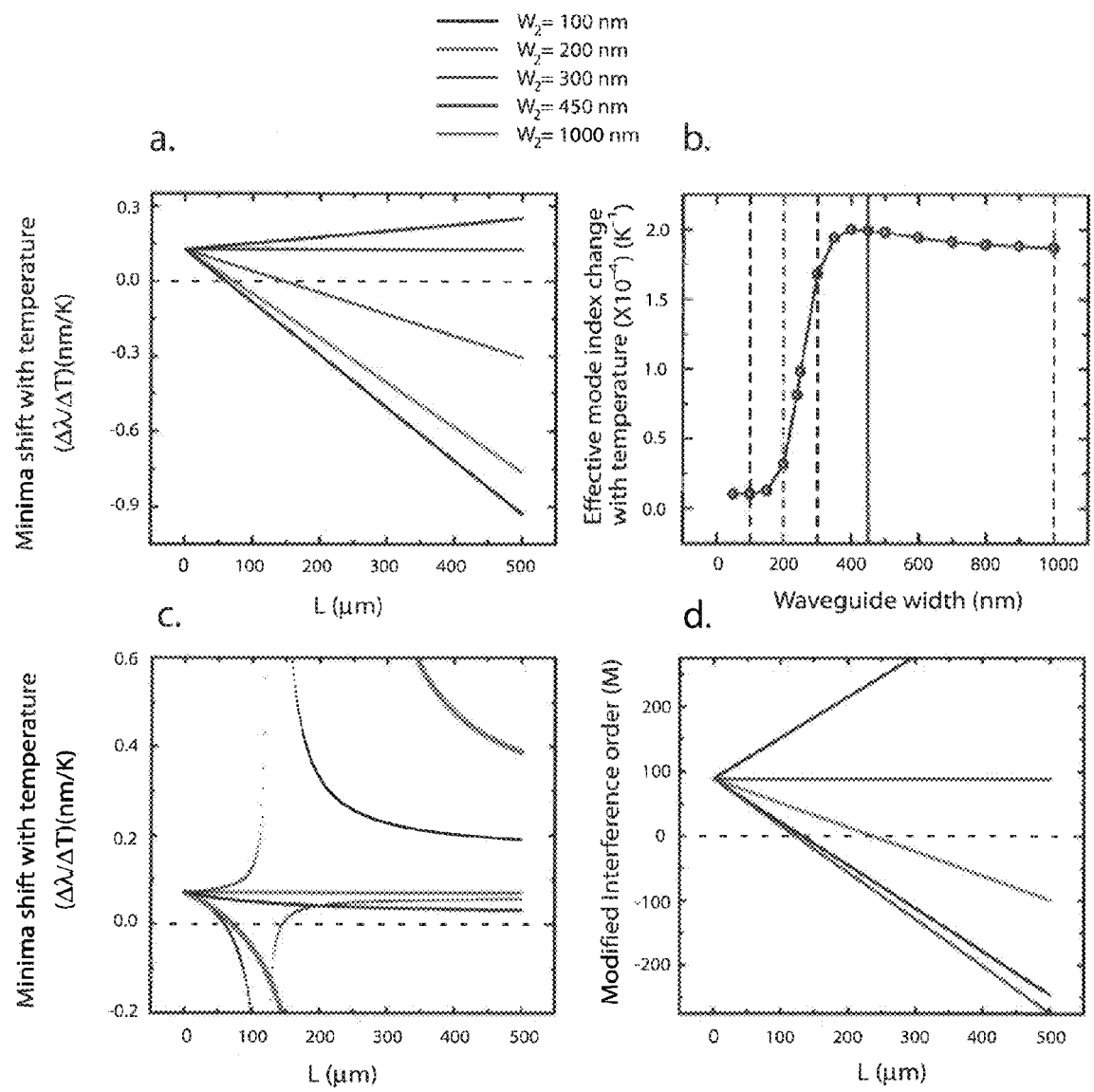
FIG. 2 shows graphs related to controlling temperature sensitivity by varying waveguide width ($w_2$) and length (L) given that $w_1$ is fixed at 450 nm and the height of the waveguides is 250 nm. (a) Spectral shift with temperature as a function of length for different waveguide widths ($w_2$) without including dispersion effect; (b) Effective mode index sensitivity to temperature for various waveguide widths; (c) Spectral shift with temperature as a function of length for different waveguide widths ($w_2$) taking dispersion into account; (d) Resulting interference order plotted against length of MZI, according to an illustrative aspects of the invention.

The dependence of $\Delta \delta/\Delta T$ on the MZI design length L is determined by dispersion and choice of differential $\delta n_{\textit{eff}}/\delta T$. FIG. 2(a) shows the temperature sensitivity without dispersion, while FIG. 2(c) takes into account the effect of dispersion. As is evident, dispersion not only changes the $\Delta \lambda/\Delta T$ profile from linear to hyperbolic, it also reverses sign after passing through zero dispersion point. The effect of dispersion has to be taken into account to accurately model the temperature sensitivity.

Compactness and robustness of the device are determined by the choice of differential widths, which manifest in differential $\delta n_{\textit{eff}}/\delta T$. FIG. 2(b) shows the magnitude of $\delta n_{\textit{eff}}/\delta T$ at 1550 nm for different waveguide widths whose height was fixed at 250 nm. FIG. 2(c) shows the temperature sensitivity of the spectra vs. length of the device for different differential widths ($w_1$=450 nm and $w_2$={100, 200, 300, 450, 1000} nm). Length of the device (L) required to achieve a given spectral shift decreases as the difference of $\delta n_{eff}/\delta T$ in the two arms increases. From FIG. 2(c) it can be seen that very large difference in $\delta n_{eff}/\delta T$ can be achieved by choosing a width of around 450 nm in one arm, and 100 nm-300 nm in the other arm. However, if the difference in widths is too large, the spectral shift ($\Delta\lambda/\Delta T$) becomes extremely sensitive to length and waveguide dimensions, so that even a small error due to fabrication imperfection can lead to significant drift of measured $\Delta\lambda/\Delta T$ from predicted value. Also thinner waveguides have a delocalized mode and higher propagation losses, which lead to poor extinction.

In the instant illustrative aspect, $w_1$=450 nm and $w_2$=200 nm were selected to give close to an order of magnitude difference in $\delta n_{eff}/\delta T$ of each arm ($1.99 \times 10^{-4}$ $K^{-1}$ for $w_1$ and $3.16 \times 10^{-5}$ $K^{-1}$ for $w_2$). The selected dimensions provided a compact structure while keeping the interference order (M)>0 at $\Delta\lambda/\Delta T$=0. The embodied device is broadband and functional over a wide spectral range; for example, a MZI designed using the above parameters for zero spectral shift with temperature at ~1550 nm will have a temperature sensitivity change of $-1.5613 \times 10^{-4}$ (nm/K)/nm over the entire C-band (1530 nm-1561 nm).

MZI Fabrication and Results

Figure 3:
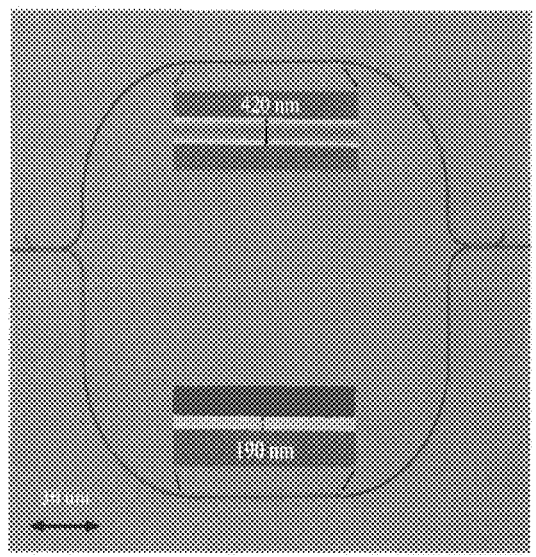
FIG. 3 shows a microscope image of the MZI designed to give zero spectral shift with temperature (L=69 μm and $\Delta L$=63 μm). SEM images of the wide and narrow waveguides are shown as insets, with their corresponding measured widths. The directional couplers have a gap of 200 nm and couple over a length of 14.5 μm; according to an illustrative aspect of the invention.

Exemplary MZIs were fabricated on a silicon-on-insulator (SOI) wafer with 240 nm Si thickness and 3 μm buried oxide thickness. 100 nm of silicon oxide was deposited on the Si layer to act as hard mask. The pattern was transferred using ma-N 2403 negative resist and electron-beam lithography. The oxide was then etched using reactive ion etching (RIE). After stripping the resist, a $Cl_2$ ICP (inductively coupled plasma) etcher was used to etch the Si. The devices were finally cladded with 3 μm of plasma enhanced chemical vapor deposition (PECVD) oxide. FIG. 3 shows a microscope image of the MZI designed to give zero spectral shift with temperature, along with insets showing scanning electron microscope (SEM) images of the wide and narrow waveguides. The waveguide widths were measured to be 420 nm and 190 nm for wide and narrow waveguides, respectively. The waveguides taper over a length of 10 μm at the width transition regions. Several devices were designed for the same interference order of 50.5 at 1550 nm, but different lengths (L) inducing different spectral shifts with temperature. An uncompensated device with constant waveguide width of 450 nm was also fabricated for reference.

Figure 4:
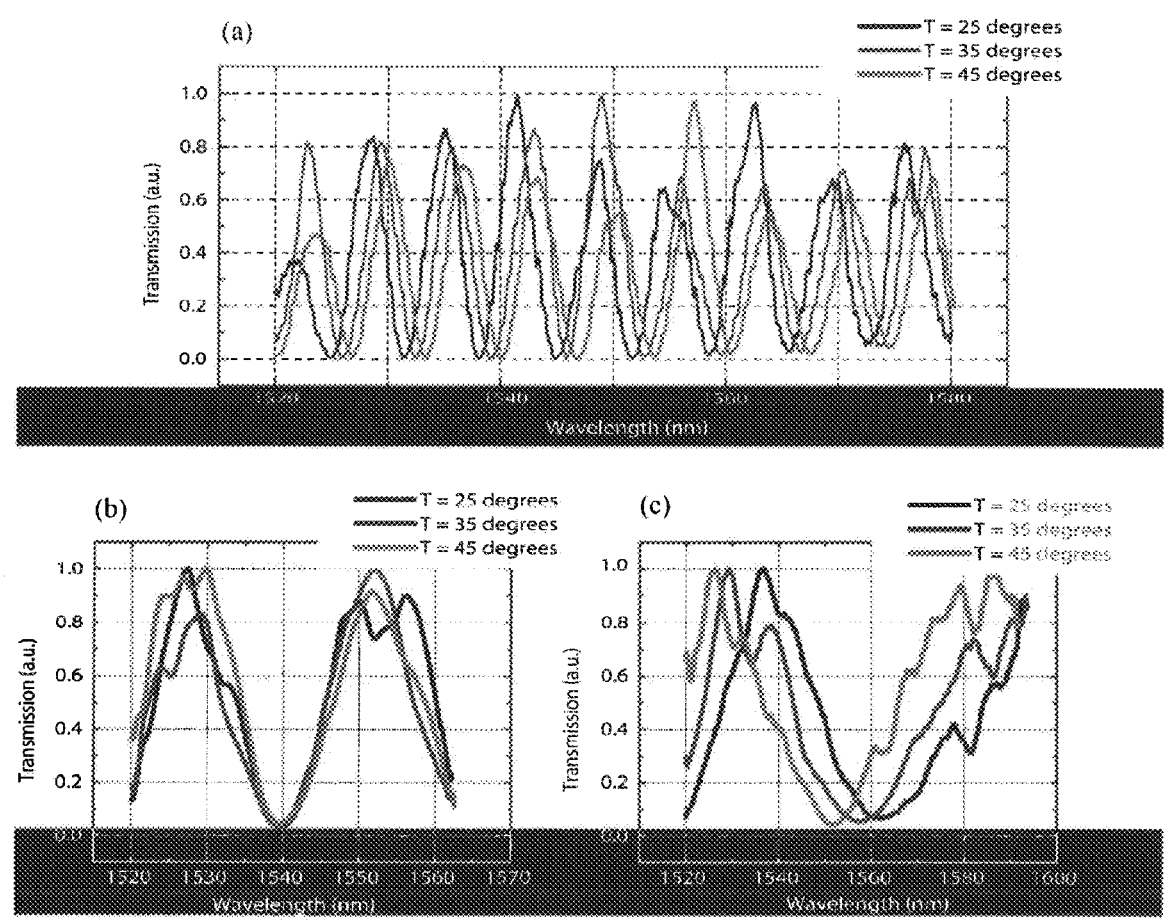
FIG. 4 shows graphs of transmission spectra of devices at different temperatures. (a) Uncompensated (0.09 nm/K) spectral shift with temperature; (b) Fully compensated spectral shift with temperature; (c) Overcompensated (−0.54 nm/K) spectral shift with temperature, according to illustrative aspects of the invention.
Figure 5:
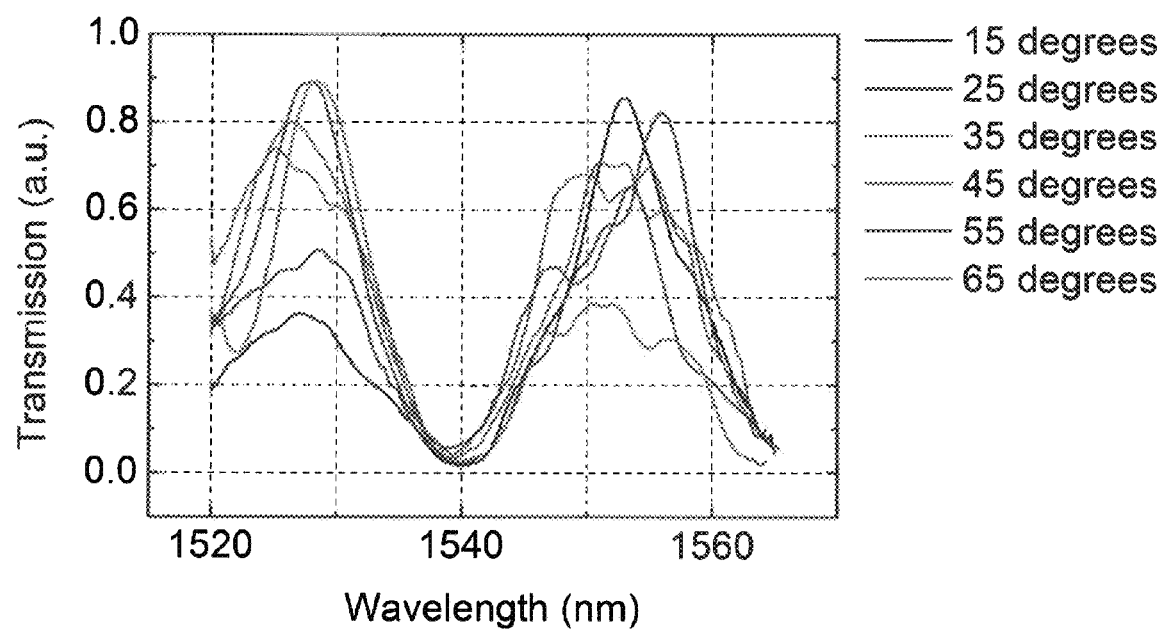
FIG. 5 shows graphs of the operation of a temperature insensitive MZI over a 50 degree range, according to an illustrative aspect of the invention. The change in extinction ratio with temperature is attributed to the variation of direction coupler efficiency with temperature.

FIG. 4(b) shows near-zero (~0.005 nm/K) temperature dependence of an MZI For comparison, FIG. 4(a) shows uncompensated spectral shifts (0.09 nm/K). FIG. 4(c) shows overcompensated spectral shifts (−0.54 nm/K) with temperature, according to an exemplary aspect of the invention. Transmission spectra of the devices in all cases correspond to TE polarization. The temperature insensitive MZI was found to operate over a greater than 50 degree range of temperature with no significant shift in the transmission minima, as shown in FIG. 5. Fundamentally the device operates over a temperature range in which the dielectric refractive indices change linearly. Hence it provides an attractive platform for designing devices to work over a wide temperature range. The ringing effect seen in the transmission spectra is due to reflection at the directional coupler interface. Also, extinction ratio changes slightly with temperature due to a change of coupling ratio at the directional coupler ports. This can be eliminated by replacing the 3 dB directional couplers with Y-splitters or multimode interferometers (MMIs), which exhibit uniform power splitting regardless of the refractive index change.

Figure 6:
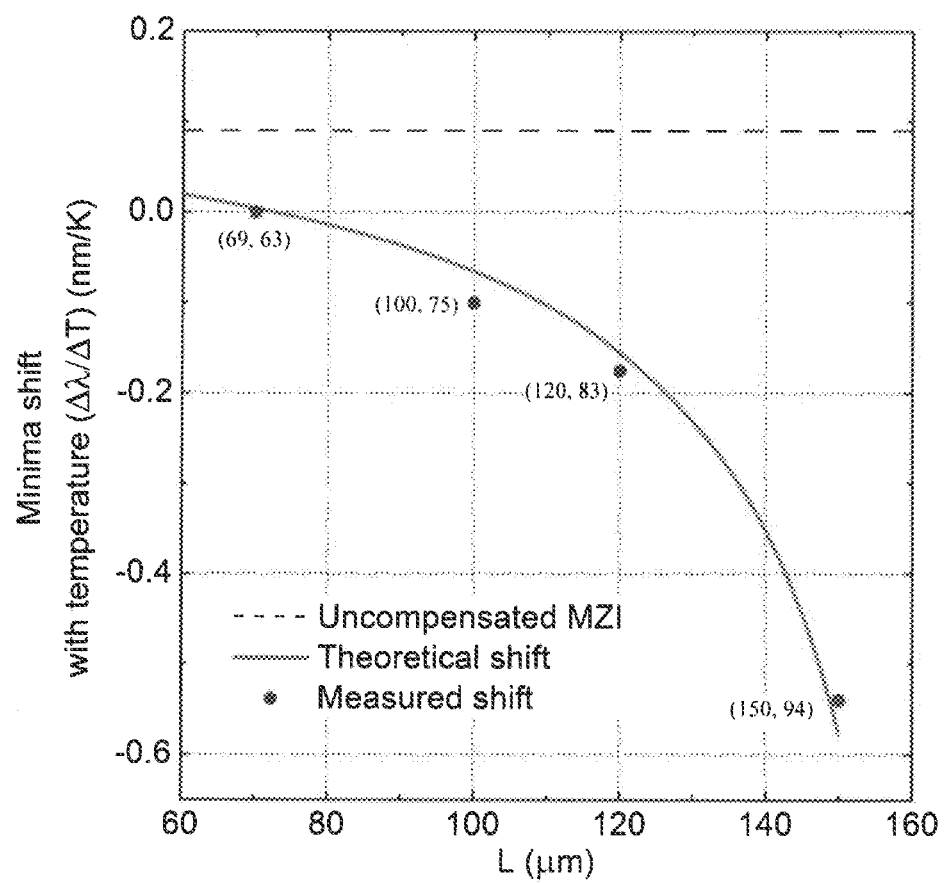
FIG. 6 is a graph showing measured spectral shift with temperature compared with theoretically calculated values. Spectral shift for uncompensated MZIs is added for reference (0.09 nm/K) for a constant waveguide width of 450 nm. The numbers in parenthesis indicate (L, $\Delta L$) in μm for the corresponding device. The devices were designed for an interference order of m=50.5 using Eq. (1)

As illustrated in FIG. 6, the measured thermal spectral shifts agree well with the theoretically predicted values using Eq. (3). In our calculations we take into account the measured waveguide widths ($w_1$=420 nm, $w_2$=190 nm). The tapered regions were also taken into consideration while calculating the spectral behavior of the device. The dashed line corresponds to the uncompensated MZIs whose sensitivity was measured to be 0.09 nm/K. In exemplary devices, we demonstrated spectral shifts as small as ~0.005 nm/K and as large as −0.54 nm/K. The mismatch between measured and theoretical values becomes somewhat large at relatively large $\Delta\lambda/\Delta T$ values when the exact dispersion profile becomes relevant. $\Delta\lambda/\Delta T$ will have linear dependence on L in the absence of any dispersion. It is the dispersion modified interference order (M) that adds a hyperbolic dependence as shown.

Figure 7:
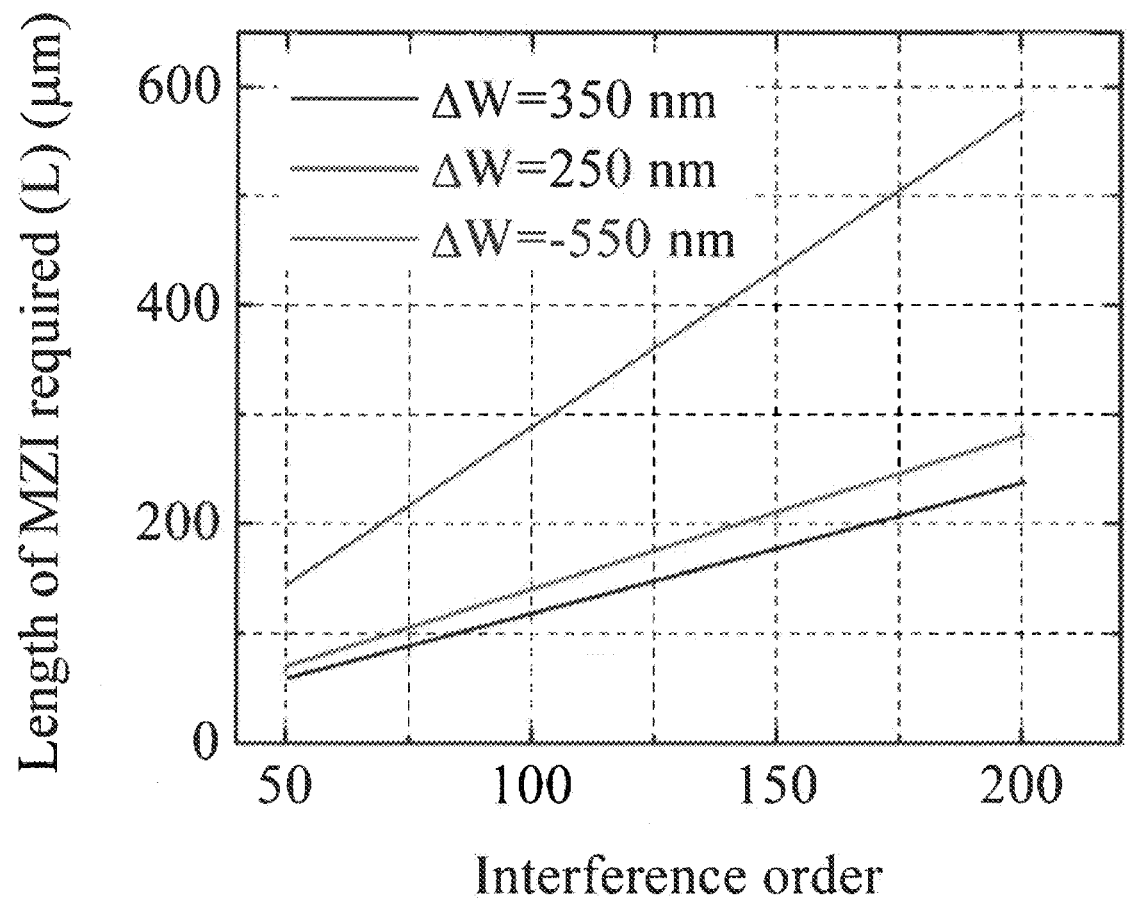
FIG. 7 shows graphs for the design of temperature insensitive MZIs for any targeted Free Spectral Range (FSR). The interference order is a half-integral value of m for a minima at 1550 nm.

The embodied design for temperature insensitive devices is fully scalable and applicable for a wide range of interference orders, i.e., free-spectral ranges of commonly used filters. This is illustrated in FIG. 7, which shows the length of MZI (L) required to achieve temperature insensitivity for a wide range of interference orders. The (L, $\Delta L$) combination is chosen for a given m based on Eq. (1) and Eq. (3). Three cases are considered where the width of one of the arms is varied (100 nm, 200 nm, 1000 nm) keeping the other arm fixed at 450 nm. The length of the device required increases linearly with interference order; however, the waveguides can be routed in a coiled manner in each arm to optimize area. The device size scales down with increasing difference in $\delta n_{eff}/\delta T$ between the two arms (see FIG. 2(b)).

The approach disclosed above can enable passive thermal compensation of CMOS-compatible optical filters, switches and modulators. These devices, when in the overcompensated mode, can also achieve large negative spectral shifts and therefore give rise to novel devices that, for example, compensate other devices with traditional positive temperature induced spectral shift, as discussed in detail below.

Passively, Thermally-Compensated Ring Resonator

FIG. 8(a) illustrates what is referred to herein as a Ring Enhanced Mach-Zehnder Interferometer (REMZI) 800, according to an exemplary embodiment of the invention. The REMZI 800 includes a balanced MZI 100 as described above and a closed loop resonator 802 in the form of a ring with radius R, optically overcoupled to the second (thinner) waveguide arm of the MZI. At resonance of the ring 802, a π phase shift is introduced in one of the arms leading to a drop in transmission.

The overall temperature dependence of the device 800 is due to two competing effects—that of the ring 802 and the MZI 100. While the ring resonance tries to redshift in wavelength with increase in temperature, the MZI is designed to have a strong spectral blueshift with temperature. These effects can be custom designed in a way to make the ring resonance oscillate about a central wavelength. The temperature dependence of the overall transmission of the REMZI can be expressed as $$\rho_{REMZI}(T) = \frac{1}{2}\left(1 + \frac{t - \alpha e^{j\beta L_R(T)}}{1 - \alpha t e^{j\beta L_R(T)}} e^{j\beta L_M(T)}\right) \quad (4)$$

where t is the through-coupling of the ring to the adjoining waveguide, α represents the round-trip loss in the ring, $L_R$ is the net optical path length of the ring, and $L_M$ is the net optical path length of the MZI. The net optical path lengths of both of the components can change with temperature due to the strong TO coefficient of Si. The ring optical path length increases monotonically with temperature, but the MZI optical path length can be designed to have a positive or negative dependence with temperature based on choice of differential waveguide widths.

$$L_R(T) = 2\pi R\left(n_{\text{eff}} + \frac{\partial n_{\text{eff}}}{\partial T}T\right) \quad (5)$$

$$L_M(T) = \left(n_{\text{eff}} + \frac{\partial n_{\text{eff}}}{\partial T}T\right)\Delta L + \left(\Delta n_{\text{eff}} + \frac{\partial(\Delta n_{\text{eff}})}{\partial T}T\right)L \quad (6)$$

While the effect of temperature is to redshift the ring phase spectra in wavelength, the MZI adds a constant phase to the ring phase, which increases monotonically with temperature. The interferometric coupling converts this phase modulation to amplitude modulation at the output. From Eqn. (4), it can be shown that the overall phase of the device at the interferometric coupler is a combination of nonlinear ring phase and linear MZI phase profiles.

$$\frac{\partial}{\partial T}\phi_{REMZI}(T) = \frac{\partial}{\partial T}\left\{\text{phase}\left(\frac{t - \alpha e^{j\beta L_{Ring}(T)}}{1 - \alpha t e^{j\beta L_{Ring}(T)}}\right)\right\} + \frac{\partial}{\partial T}(\beta L_{MZI}(T)) \quad (7)$$

$$\text{where phase }(X) = \arctan\left(\frac{\text{Im}(X)}{\text{Re}(X)}\right),$$

X being a complex number.

Figure 8:
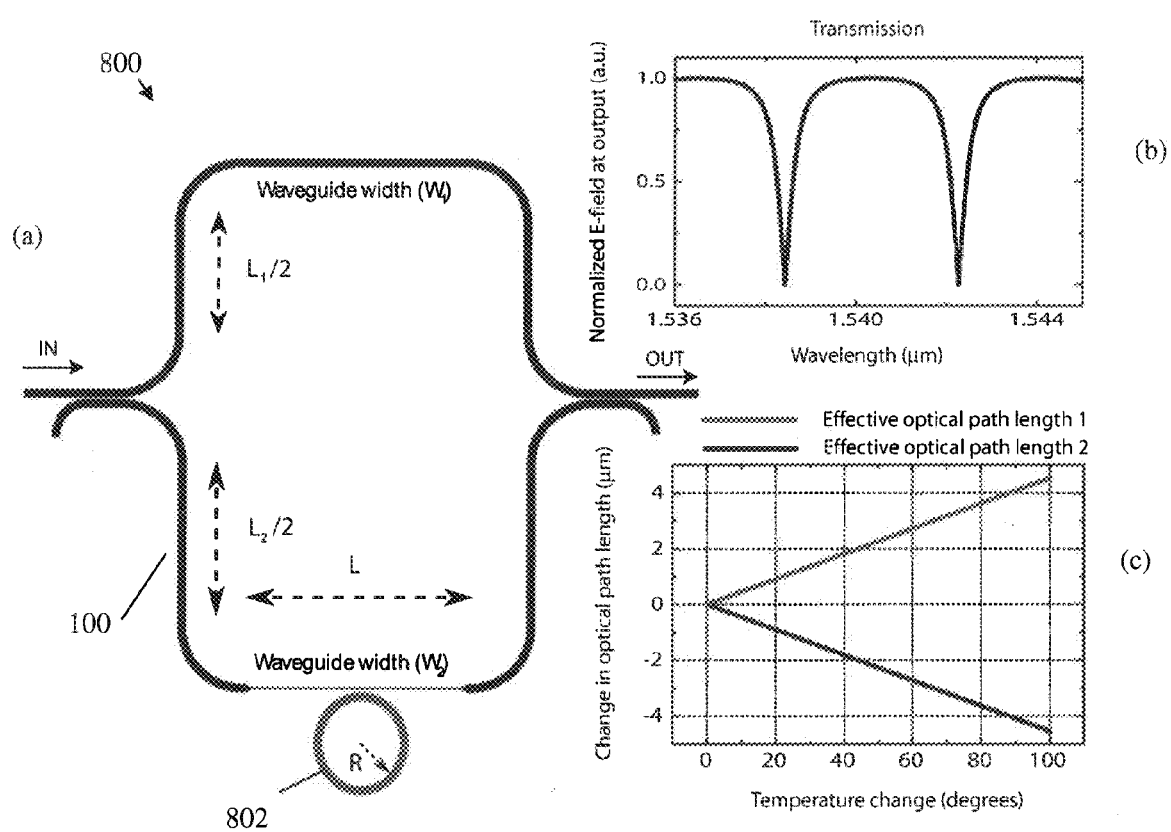
FIG. 8(a) schematically shows a Ring-Enhanced mach-Zehnder Interferometer (REMZI) according to an exemplary embodiment of the invention.
FIG. 8(b) is a graph showing the typical transmission spectrum.
FIG. 8(c) is a graph showing the effective optical path length change with temperature.
Figure 9:
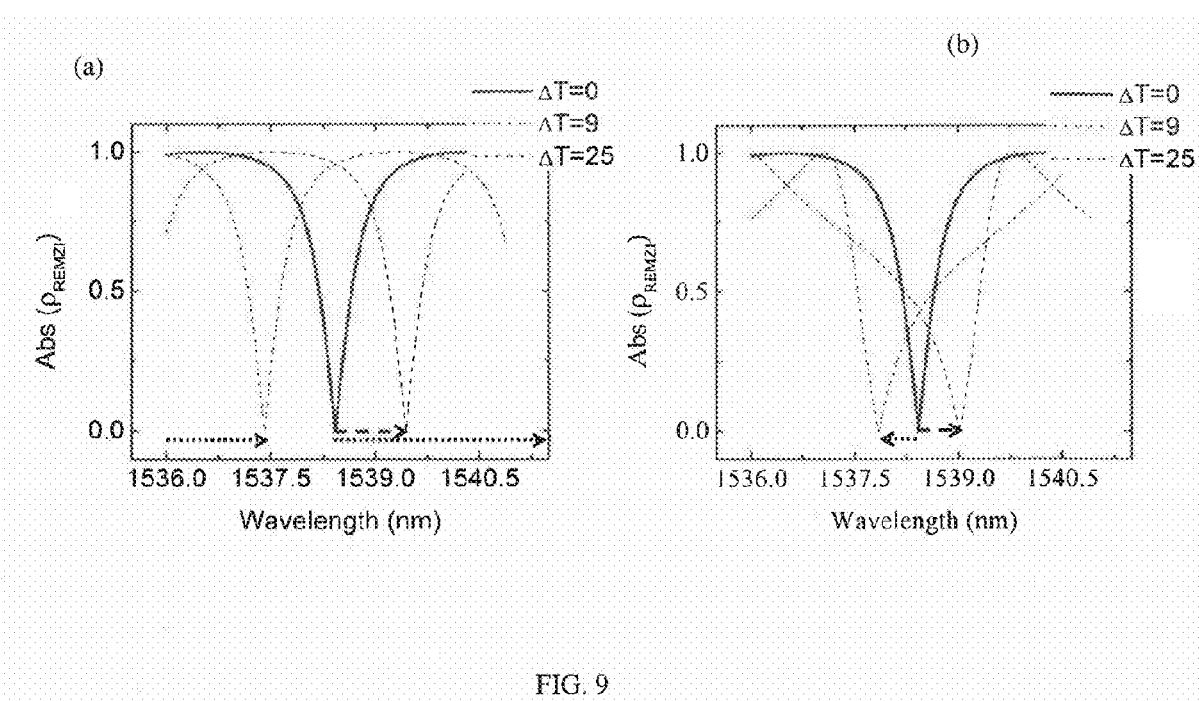
FIG. 9(a) shows resonance drift for a normal (uncompensated) ring resonator with temperature.
FIG. 9(b) shows resonance oscillation for a perfectly compensated ring, according to an exemplary embodiment of the invention.
Figure 10:
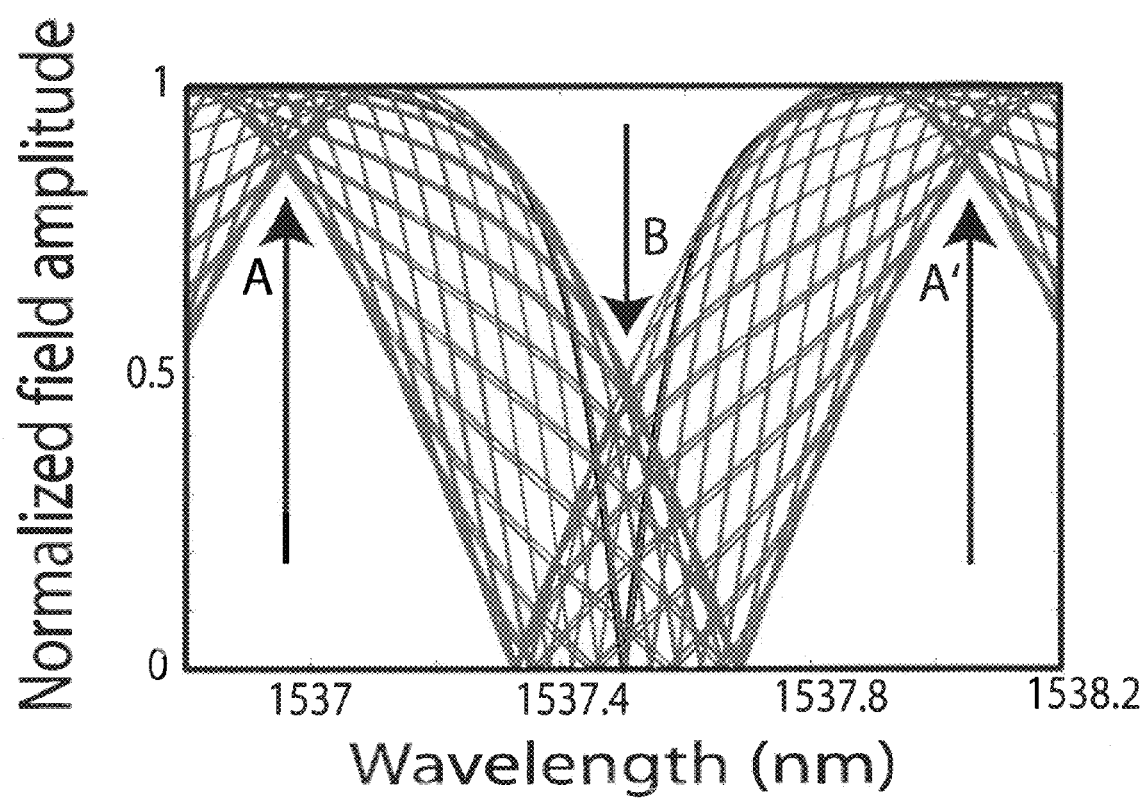
FIG. 10 is a Thermal Eye diagram and shoes resonances at different temperatures superimposed on each other with athermal operating wavelengths marked by A, A' and B, according to an illustrative aspect of the invention

A conventional MZI has a positive $L_M(T)$ and hence $\phi_{REMZI}$ increases monotonically with temperature. In an exemplary aspect, $L_M(T)$ can have a large negative value, which can substantially lower the effective redshift of the phase spectra with temperature. When the rate of change of the MZI path length ($L_M$) is exactly negative of that of the ring path length ($L_R$), as illustrated in FIG. 8(*c*), the resonance starts oscillating with temperature, as illustrated in FIG. 9(*b*), instead of drifting away as illustrated in (FIG. 9(*a*). A plot of transmission corresponding to several different temperatures, as shown in FIG. 10, shows the resulting "Thermal Eye," which clearly shows distinct athermal operating wavelengths (marked by arrows) for resonance LOW (marked B) and HIGH (marked A and A').

Figure 11:
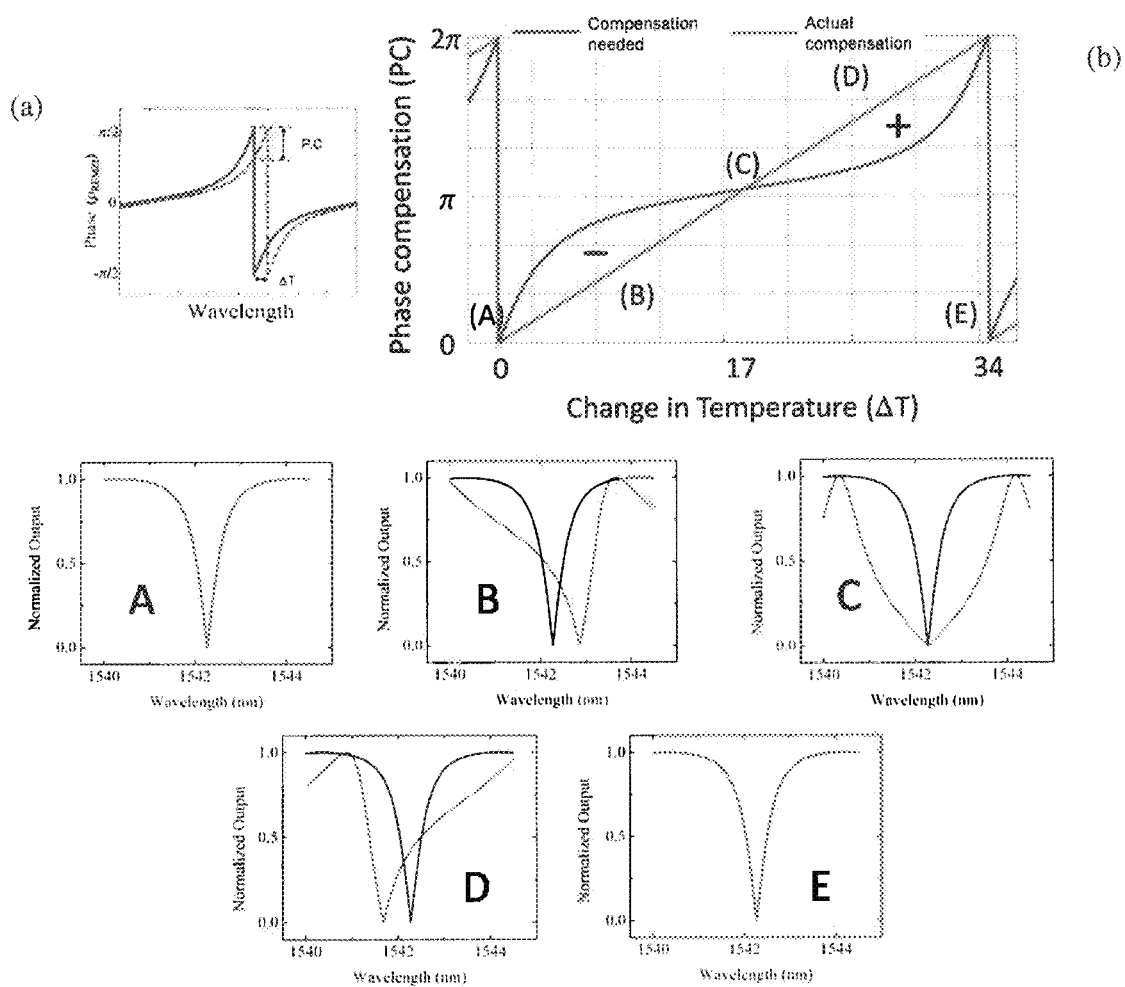
FIG. 11(a) is a graph showing the phase compensation required to stabilize the resonance at a certain wavelength compared with FIG. 11(b), which shows the actual compensation proved by a MZI FIGS. 11(A-E) show resonance lineshapes at various temperatures of the phase compensation plot, black line shows the ideal resonance shape and the red line shows the resonance shape for MZI compensated ring.

To stabilize the resonance of the ring at a given wavelength, a given amount of compensating phase has to be added at that wavelength at every given temperature as the ring phase spectra redshifts. The corresponding phase compensation needed for an exemplary 40 μm radius ring as a function of temperature is plotted in FIG. 11(*a*). Actual phase added by the MZI, with its FSR (Free Spectral Range) is matched with that of the ring, as shown in FIG. 11(*b*). It can be seen in FIG. 11(*b*) that the nonlinearity of the ring phase spectrum gives rise two distinct regions—one where the MZI added phase is smaller than the compensating phase required, and one where the MZI added phase is larger than the compensating required. This pattern repeats after each spectral period. It is this periodic mismatch between the phase added by the MZI and the phase compensation required that gives rise to perfect oscillation in the ring resonance with temperature. We call this property 'self-restoring thermal phase shift'.

Figure 12:
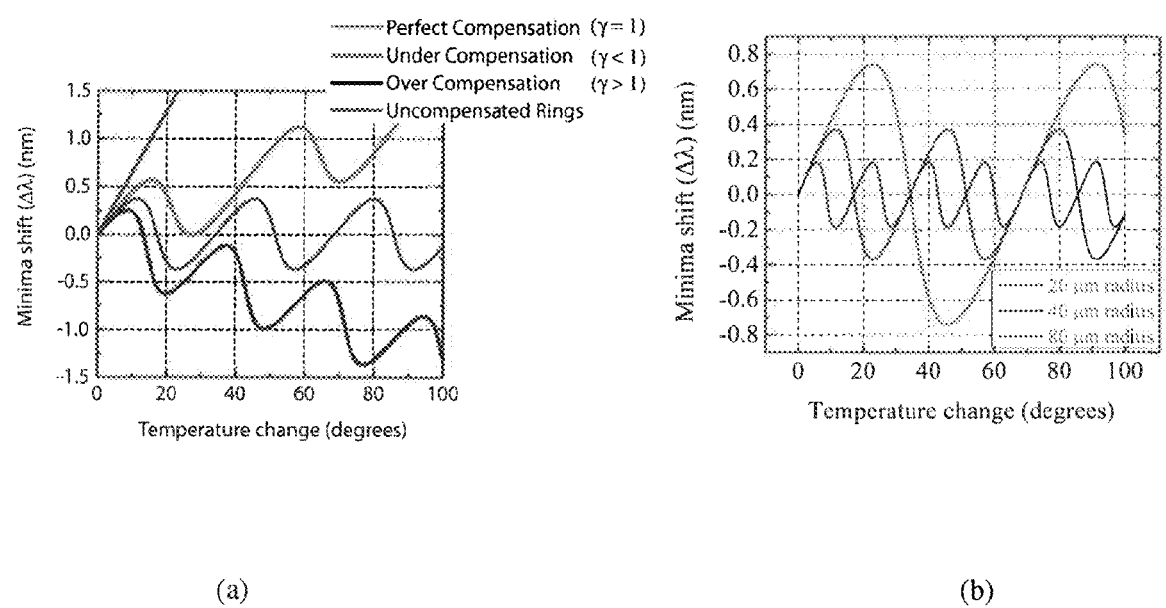
FIG. 12(a) is a graph showing minima shift with temperature for different compensation cases.
FIG. 12(b) is a graph showing dependence of resonance oscillation on ring radius for constant coupling, according to illustrative aspects of the invention.

The periodic oscillation in the resonance of the ring is stable only for a particular choice of $L_M(T)$. If the compensation is larger or smaller than this value, the ring resonance slowly drifts away with temperature while still exhibiting the periodic behavior. This is in sharp contrast with normal ring-like systems, where the resonance drifts monotonically with temperature. For a system with transmission given by Eqn. (4), the locus of the minima points of the spectra behaves as $$\Delta\lambda = \left(\frac{\lambda_0}{L_R + \chi L_M}\right)\frac{\partial L_R}{\partial T}\left(T - \frac{2}{\beta\frac{\partial L_R}{\partial T}}\tan^{-1}\left\{\frac{1-t}{1+t}\tan\left(\frac{\gamma\beta\frac{\partial L_R}{\partial T}T}{2}\right)\right\}\right) \quad (8)$$

where $$\chi = \frac{1 - t^2}{1 + t^2 + 2t\cos(\beta L_M)}$$

and
$\gamma = \text{abs}[\delta L_M/\delta T/\delta L_R/\delta T]$. FIG. 12(*a*) shows the behavior of $\Delta\lambda$ for several different values of γ. When $|\gamma|=1$, there is perfect oscillation in the system resonance. If $|\gamma|>1$, the ring is undercompensated and the resonance slowly blueshifts with temperature; while if $|\gamma|<1$, the ring is overcompensated and the resonance slowly redshifts. The oscillations occur for all the cases.

We note that for same coupling and perfect compensation, a ring with a larger radius, R, oscillates less than a ring with smaller radius (FIG. 12(*b*) because the resonances of a larger ring are more closely spaced and, the phase compensation mismatch width (FIG. 11(*b*)) is smaller, hence less oscillations. This property can be utilized in WDM (wavelength division multiplexing) systems, where n smaller rings with radii R+nδr can be stabilized using only a single MZI, by combing their resonances in a periodic manner in the FSR. From Eqn. (8) it can be deduced that the resulting thermal oscillations (Δλ) will be 1/n times smaller than single ring case.

Figure 13:
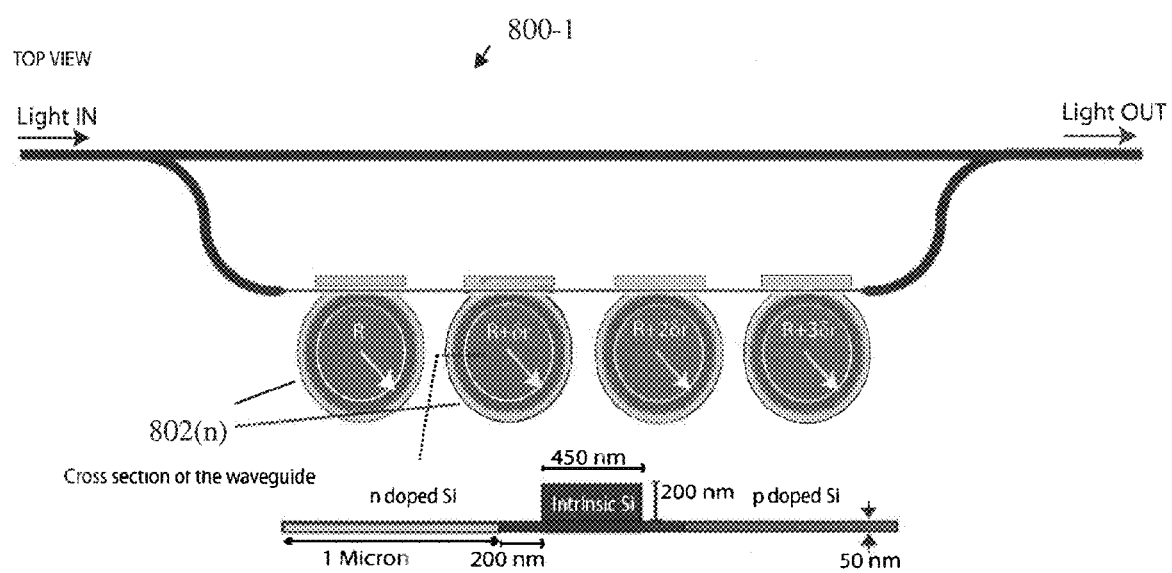
FIG. 13 is a schematic of a WDM optical interconnection system with cascaded silicon ring resonators as WDM modulators, according to an exemplary aspect of the invention. The PIN cross section is shown in inset.

According to a developmental, illustrative aspect of the invention, we propose a n×10 Gbits/sec (2≦n≦8) modulator 800-1 as illustrated in FIG. 13 that is thermally insensitive. We note that in principle, however, several other athermal devices based on ring resonators could be demonstrated including switches and filters. The modulator application enables ultra-high bandwidth on-chip and is a necessary component for several proposed architectures for photonic networks on-chip.

A temperature insensitive n×10 Gbits/sec modulator 800-1 using the geometry described above, includes several cascaded ring resonators, which will all be (evanescently) coupled to one MZI, as shown in FIG. 13. Each ring is capable of performing >10 Gbits/sec modulation, thus giving a total modulation capacity of over n×10 Gbits/sec for the entire system. Advantageously, the structure will be located within one thermal 'hot spot'. A 'hot spot' is defined as a region of localized high power dissipation on a microelectronic chip, with a spatial temperature variation of 0.05° K. The size of the hot spot is about 500 μm×500 μm for microelectronics. This can be accomplished by routing the MZI arms in a coil to optimize the area.

Figure 14:
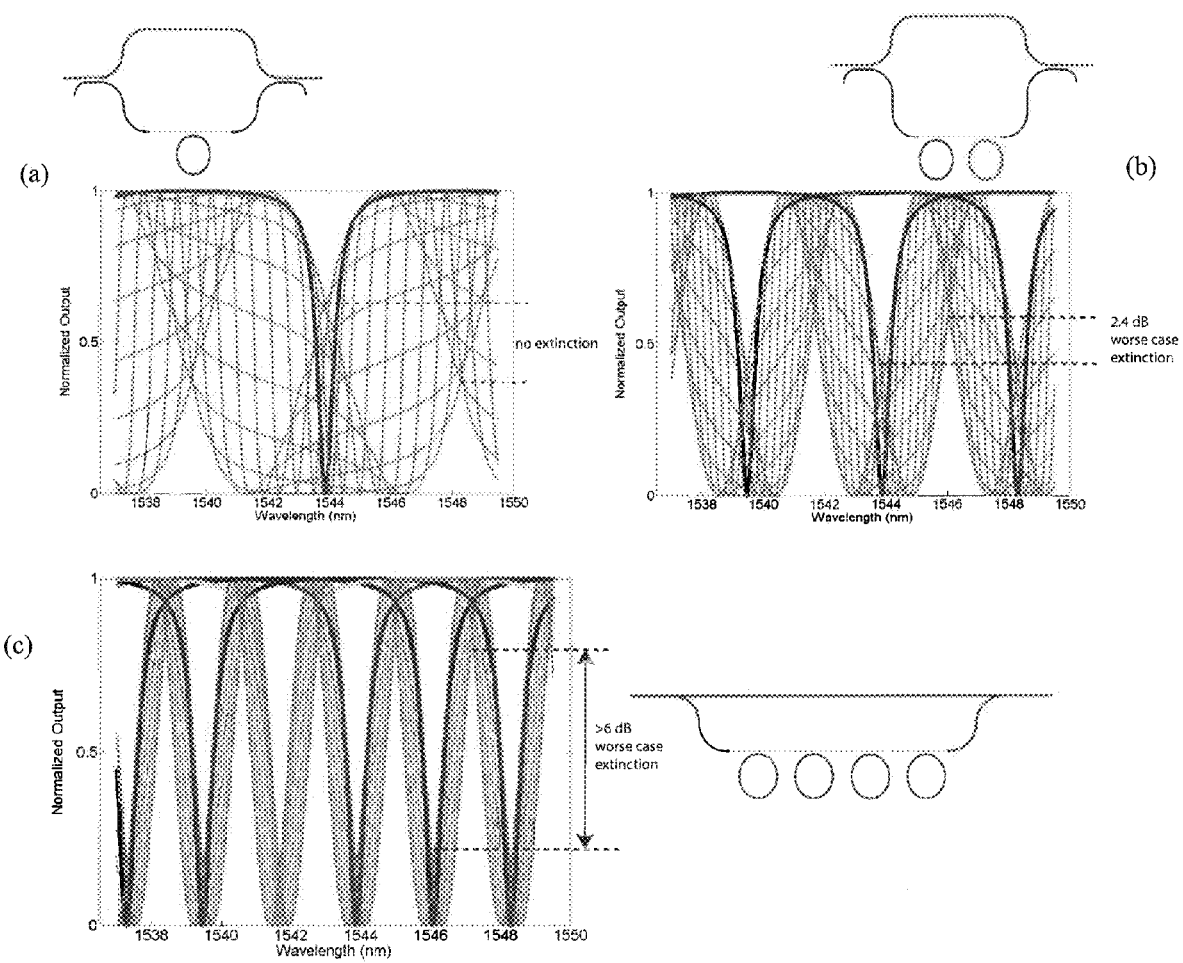
FIG. 14(a) shows the thermal eye of a single ring resonator.
FIG. 14(b) shows the thermal eye for two cascaded rings.
FIG. 14(c)) shows the thermal eye for a 4-ring WDM system, assuming identical coupling.

The integration of multiple rings on the same MZI is expected to minimize the temperature fluctuations of each resonance of the system. This is because the maximum phase mismatch (FIG. 11(*b*)) between the MZI and the rings is smaller for a higher density of resonances over the same temperature range and hence smaller oscillations are experienced by the device. FIG. 14 illustrates this improvement by comparing the "Thermal Eyes" of cascaded two- and four-ring systems to that of a single ring, assuming identical coupling (and hence Q) in each case. It is shown that the extinction ratio can be significantly improved to over >6 dB for a wide temperature range. This level of extinction is sufficient for obtaining BERs of less than $10^{-9}$ suitable for most photonics applications.

Figure 15:
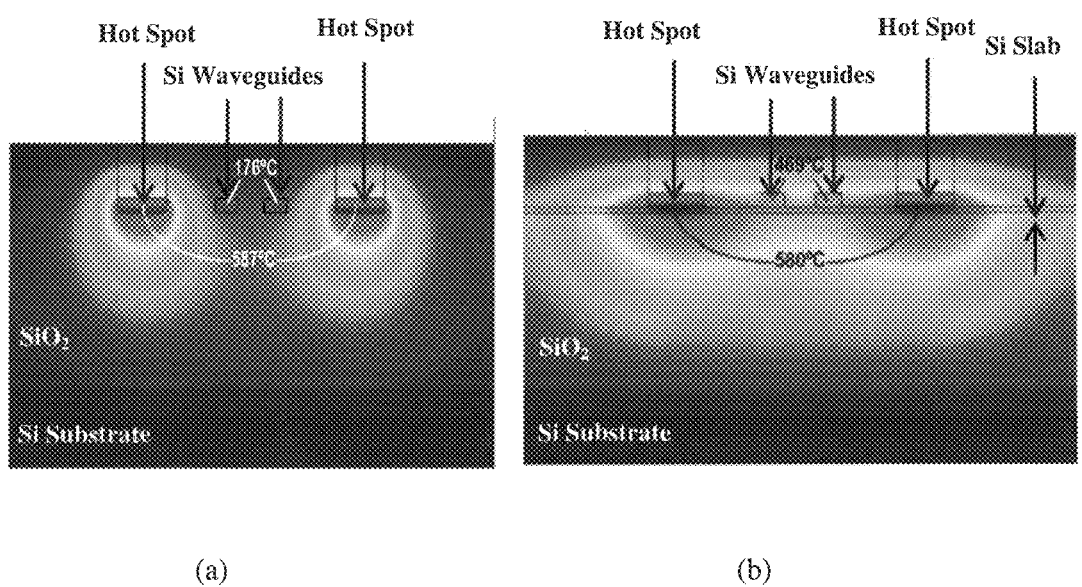
FIG. 15(a) shows a cross sectional, schematic view showing waveguides between two hotspots, and the extent of the heat generated by the latter.
FIG. 15(b) shows the waveguides between hot spots with a Si slab, and the extent of the heat generated by the heaters.

In order to ensure that the same amount of temperature fluctuation due to the modulation process itself is experienced not only by the ring but also by the MZI, we will design thermally conductive structures. For example, instead of using embedded waveguides, ridge waveguides with a slab could be used. The slab ensures thermal conductivity so that both structures experience the same temperature. The slab will be small enough to ensure high confinement of the mode. FIG. 15(a) shows two adjacent waveguides (200 nm thick by 450 nm wide) separated by 550 nm FIG. 15(b) shows the same waveguides but now connected by a slab. One can see that the slab aids in achieving uniform temperature across regions connected by the slab.

Fabrication and Results

Exemplary devices 800 were fabricated on a silicon-on-insulator (SOI) wafer with 240 nm Si thickness and 3 µm buried oxide thickness. 100 nm of silicon oxide was deposited on the Si layer to act as hard mask. The pattern was transferred using ma-N 2403 negative resist and electron-beam lithography. Then the oxide was etched using reactive ion etching (RIE). After stripping the resist, a $Cl_2$ ICP (inductively coupled plasma) etcher was used to etch the Si. The devices were finally cladded with 3 µm of plasma enhanced chemical vapor deposition (PECVD) oxide.

Figure 16:
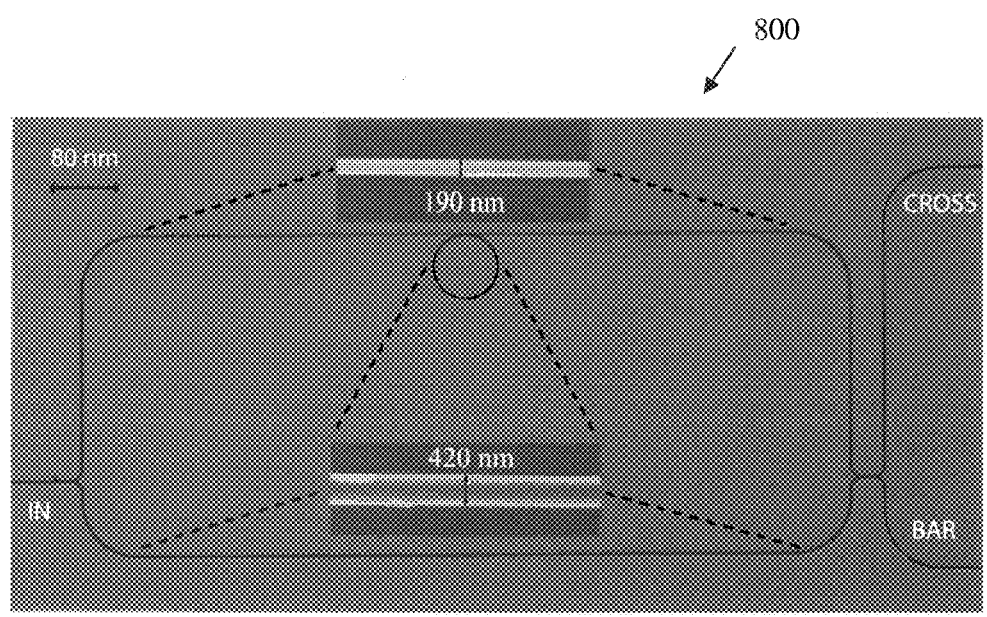
FIG. 16 shows an optical microscope image of a modulator device with SEM images showing waveguides widths at various points of the device, according to an exemplary embodiment of the invention.

FIG. 16 shows the optical microscope image of a 40 µm radius ring coupled to a balanced MZI (optical path lengths of the two arms are equal) with SEM insets showing the corresponding waveguide widths. The waveguide widths were measured to be 420 nm and 190 nm for wide and narrow waveguides respectively. The waveguides taper over a length of 10 µm at the width transition regions. The ring-to-waveguide coupling gap for the device shown in FIG. 16 was 110 nm, which gives a cross-coupling constant of κ=0.4.

Figure 17:
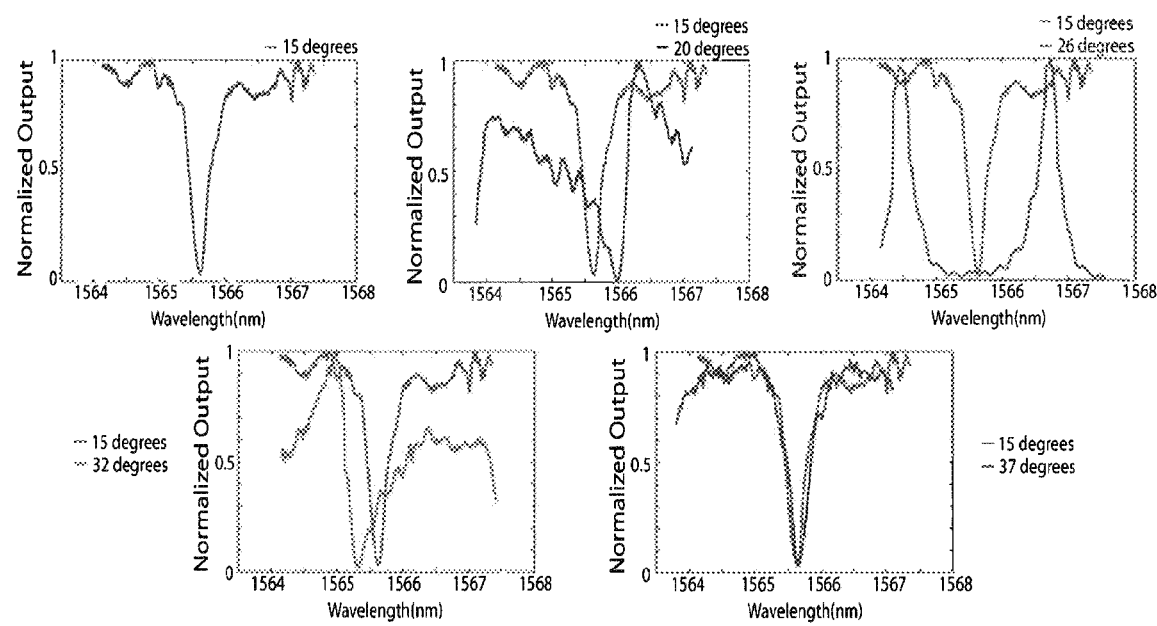
FIG. 17 are graphs showing spectra at different temperatures overlaid, demonstrating athermal device operation, according to an illustrative aspect of the invention.
Figure 18:
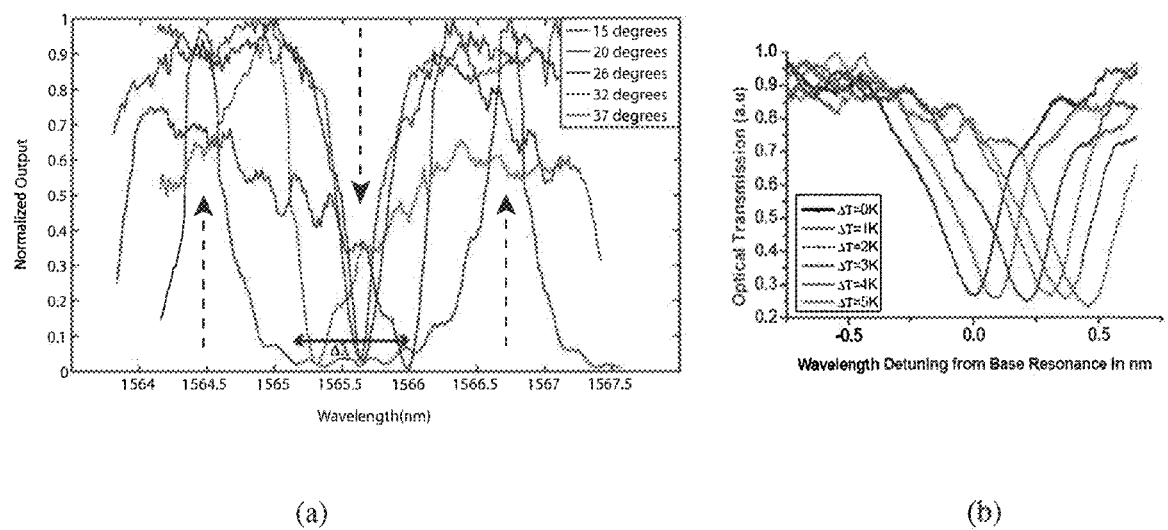
FIG. 18(a) is a graph showing spectra at different temperatures overlaid for a modulator device, with arrows showing athermal wavelengths, according to an illustrative aspect of the invention.
FIG. 18(b) is a graph showing spectra at different temperatures overlaid in the case of a conventional ring resonator.

FIG. 17 shows preliminary measurements of the device 800, and demonstrate the oscillatory resonance behavior discussed above. The transmission around 1565.5 nm for several different temperatures or, the Thermal Eye, is shown in FIG. 18, with arrows showing athermal wavelengths. For comparison, the corresponding Thermal Eye of a conventional ring resonator is also shown, which clearly shows that the resonance redshifts monotonically with increase in temperature. This oscillatory behavior in our devices is exhibited for all the resonances in the spectrum. In the instant aspect, the oscillation width was less than 1 nm with less than 3 dB degradation in the resonance HIGH or LOW value. For a ring of given radius, R, the oscillation width and the overall degradation depend entirely on the coupling constant (κ). Lower κ leads to smaller thermal oscillation in resonance, at the expense of lower quality factor of the cavity. Quality factor is defined for the case when the spectral shape is perfect Lorentzian. Our measured quality factor was around 7000, which is very acceptable for most switching and modulating applications.

Figure 19:
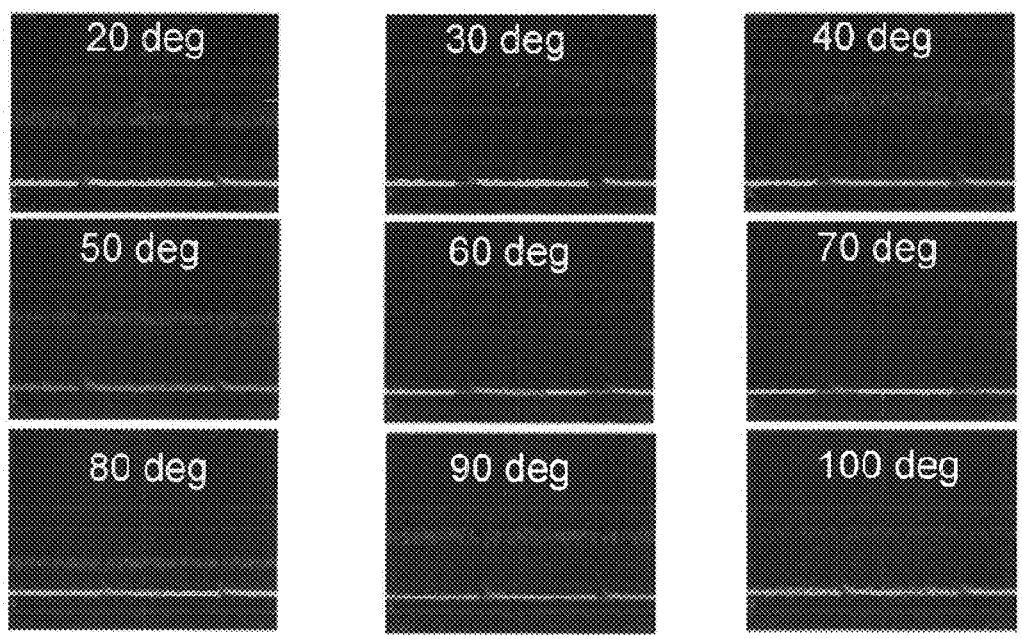
FIG. 19 shows eye diagrams corresponding to 1 Gbps data, at different temperatures, demonstrating athermal device operation, according to an illustrative aspect of the invention.

Continuous operation over 80 degrees (20° C. to 100° C.) was demonstrated by passing a 1 Gbps, $2^7$-1 pseudo-random data at a cross port resonance. The wavelength was chosen slightly off-resonance (FIG. 19 inset) because the spectral shape at base temperature (22.5° C.) was not perfectly Lorentzian, so athermal wavelength was determined by taking readings at different temperatures and overlaying the corresponding spectra. Eye diagrams at different temperatures are shown in FIG. 19. The corresponding eye diagrams show error free operation over the entire range. The eye opening goes up and down, showing the oscillatory behavior of the resonance, but the eye never goes below 3 dB relative to the base temperature, thus demonstrating athermal behavior (80° C. is believed to be a "bad point" in the data).

In regard to all of the foregoing disclosed embodiments and aspects, types of interferometers other than the illustrative, waveguide-based Mach-Zehnder interferometer could be used, and, any closed loop optical resonator type other than the illustrative, waveguide-based microring resonator could be used, as understood by a person skilled in the art based upon the teachings set forth herein.

All references, including publications, patent applications, and patents cited herein are hereby incorporated by reference in their entireties to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A photonic apparatus, comprising:
    an interferometer having a second arm, wherein the interferometer is characterized by a negative net optical path length change as a function of temperature, $\delta L_M/\delta T$; and
    a waveguide closed loop resonator characterized by a positive optical path length change as a function of temperature, $\delta L_R/\delta T$, disposed in light-coupling proximity to the second interferometer arm, wherein the absolute value of $\delta L_M/\delta T$ is equal to the absolute value of $\delta L_R/\delta T$, such that the apparatus is characterized by a resonance having substantially no spectral shift as a function of temperature, wherein the apparatus is an athermal/temperature insensitive, resonant photonic device.

2. The apparatus of claim 1, wherein the interferometer further comprises:
   a first waveguide arm having a length $L_1$ wherein at least a portion of the first waveguide arm, $L_{1W(1)}$, has a width $w_1$, and an effective mode index $n_{\textit{eff}(1)}$; and,
   wherein the second arm is a waveguide having a length $L_2$ and a width $w_1$, wherein at least a portion of the second waveguide arm, $L_{2W(2)}$, has a maximum width $w_2$ that is less than $w_1$ over $L_{2W(2)}$, and the second waveguide arm is optically coupled to the first waveguide arm,
   further wherein the interferometer is characterized by an effective mode index $n_{\textit{eff}(2)}$, where $|L_2-L_1|=\Delta L\neq 0$, $L_{2W(2)}=L_{1W(1)}$, $w_1-w_2=\Delta w$, and $|n_{\textit{eff}(2)}-n_{\textit{eff}(1)}|=\Delta n_{\textit{eff}}\neq 0$.

3. The apparatus of claim 1, wherein the interferometer is a waveguide-based Mach-Zehnder interferometer (MZI).

4. The apparatus of claim 1, wherein the closed loop waveguide resonator is a ring resonator having a radius, R.

5. The apparatus of claim 1, wherein the interferometer and the closed loop resonator are integrated on a chip.

6. The apparatus of claim 2, wherein the first and second waveguide arms are each in the form of a coil.

7. The apparatus of claim 1, further characterized by a controllable positive or negative temperature sensitivity.

8. The apparatus of claim 7, characterized by a negative temperature sensitivity having a magnitude equal to or less than −0.005 nanometers per degree Kelvin (nm/K).

9. The apparatus of claim 7, characterized by a negative temperature sensitivity equal to or less than −0.5 nm/K.

10. The apparatus of claim 1, wherein the interferometer is further characterized by an interference order, M, where M can be any positive or negative integer or zero at $\Delta\lambda/\Delta T=0$, where $\Delta\lambda/\Delta T$ represents the temperature sensitivity of any wavelength value within a given wavelength spectrum.

11. The apparatus of claim 2, wherein the second waveguide arm is tapered over transition regions between $L_2$ and $L_{2W(2)}$.

12. The apparatus of claim 1, characterized by an optical resonance that oscillates about a central wavelength with change of temperature.

13. The apparatus of claim 2, characterized by a temperature-dependent transmission function,
$$\rho(T)=\tfrac{1}{2}\{1+[(t-\alpha\exp(i\beta L_R(T)))/(1-\alpha t\exp(i\beta L_R(T)))]\exp(i\beta L_{MZI}(T))\},$$
where t is the through-coupling of the ring to the second waveguide arm, $(1-\alpha)$ is the round-trip loss in the ring, $L_R$ is the net optical path length of the ring, and $L_{MZI}$ is the net optical path length of the MZI.

14. The apparatus of claim 3, further comprising only a single MZI and a plurality, n, of waveguide ring resonators serially disposed in light-coupling proximity to the second arm, wherein each ring resonator has a different radius, $R_n$.

15. The apparatus of claim 14, where each resonator has a resonance such that the resonances are spectrally equidistant and non-overlapping, where $\lambda_n-\lambda_{n-1}=$(Free spectral range of any resonator)/n.

16. The apparatus of claim 14, wherein the apparatus is a temperature insensitive electro-optic modulator.

17. A method for stabilizing the temperature-induced drift of the optical resonance of a closed loop resonator at a given wavelength, comprising:
   providing a closed loop resonator characterized by a phase spectrum in the form of a resonance that non-linearly red-shifts in wavelength with increase in temperature and phase at any given wavelength; and
   providing a matching phase spectrum that changes linearly with temperature at the given wavelength,
   wherein the matched phase spectrums have a phase change from $\Phi_0$ to $\Phi_0+2\pi$ over the temperature change ($\Delta T$).

18. The method of claim 17, wherein the closed loop resonator has a positive optical path length change as a function of temperature, $\delta L_R/\delta T$, and the step of providing a matching phase spectrum further includes coupling light from the closed loop resonator to an arm of an interferometer that is characterized by a negative net optical path length change as a function of temperature, $\delta L_M/\delta T$, where the absolute value of $\delta L_M/\delta T$ is equal to the absolute value of $\delta L_R/\delta T$.

19. The method of claim 18, wherein the interferometer is a waveguide-based Mach-Zehnder interferometer (MZI).

* * * * *